United States Patent
Kim et al.

(10) Patent No.: US 11,210,470 B2
(45) Date of Patent: Dec. 28, 2021

(54) AUTOMATIC TEXT SEGMENTATION BASED ON RELEVANT CONTEXT

(71) Applicant: ADOBE INC., San Jose, CA (US)

(72) Inventors: Seokhwan Kim, San Jose, CA (US); Walter W. Chang, San Jose, CA (US); Nedim Lipka, Campbell, CA (US); Franck Dernoncourt, Sunnyvale, CA (US); Chan Young Park, Pittsburgh, PA (US)

(73) Assignee: Adobe Inc., San Jose, CA (US)

( * ) Notice: Subject to any disclaimer, the term of this patent is extended or adjusted under 35 U.S.C. 154(b) by 159 days.

(21) Appl. No.: 16/368,334

(22) Filed: Mar. 28, 2019

(65) Prior Publication Data

US 2020/0311207 A1    Oct. 1, 2020

(51) Int. Cl.
*G06F 40/30*    (2020.01)
*G06N 3/08*    (2006.01)

(52) U.S. Cl.
CPC ........... *G06F 40/30* (2020.01); *G06N 3/084* (2013.01)

(58) Field of Classification Search
CPC ......... G06F 40/30; G06F 40/166; G06N 3/08; G06N 3/084; G06N 3/04
See application file for complete search history.

(56) References Cited

U.S. PATENT DOCUMENTS

| | | | |
|---|---|---|---|
| 6,996,529 B1 * | 2/2006 | Minnis | G10L 13/10 704/258 |
| 7,308,138 B2 * | 12/2007 | Kawatani | G06F 40/289 382/173 |
| 10,664,696 B2 * | 5/2020 | Patil | G06K 9/628 |
| 10,733,380 B2 * | 8/2020 | Leidner | G06F 17/18 |
| 10,783,331 B2 * | 9/2020 | Xia | G06K 9/6271 |
| 10,922,486 B2 * | 2/2021 | Srivatsa | G06F 40/30 |
| 10,943,064 B2 * | 3/2021 | Mungi | G06F 16/2228 |
| 2012/0191457 A1 * | 7/2012 | Minnis | G10L 13/10 704/260 |
| 2018/0240013 A1 * | 8/2018 | Strope | G06F 16/335 |
| 2018/0329884 A1 * | 11/2018 | Xiong | G06N 3/0445 |
| 2019/0103091 A1 * | 4/2019 | Chen | G06F 40/279 |

(Continued)

FOREIGN PATENT DOCUMENTS

WO    WO-2020253052 A1 * 12/2020

OTHER PUBLICATIONS

Attention-based long short-term memory network using sentiment lexicon embedding for aspect-level sentiment analysisin Korean; Minchae Song et al. (Year: 2018).*

(Continued)

*Primary Examiner* — Mohammad K Islam
(74) *Attorney, Agent, or Firm* — Shook, Hardy & Bacon L.L.P.

(57) ABSTRACT

Methods and systems are provided for identifying subparts of a text. A neural network system can receive a set of sentences that includes context sentences and target sentences that indicate a decision point in a text. The neural network system can generate context vector sentences and target sentence vectors by encoding context from the set of sentences. These context sentence vectors can be weighted to focus on relevant information. The weighted context sentence vectors and the target sentence vectors can then be used to output a label for the decision point in the text.

20 Claims, 9 Drawing Sheets

(56) References Cited

U.S. PATENT DOCUMENTS

| | | | | |
|---|---|---|---|---|
| 2019/0130204 | A1* | 5/2019 | Li | G06K 9/3258 |
| 2019/0147304 | A1* | 5/2019 | Liu | G06K 9/6257 |
| | | | | 382/157 |
| 2019/0236139 | A1* | 8/2019 | DeFelice | G06F 40/56 |
| 2019/0272438 | A1* | 9/2019 | Liu | G06N 3/04 |
| 2020/0135158 | A1* | 4/2020 | Yao | G10H 7/00 |
| 2020/0143115 | A1* | 5/2020 | Brigham | G06F 40/174 |
| 2020/0143247 | A1* | 5/2020 | Jonnalagadda | G06F 40/284 |
| 2020/0257857 | A1* | 8/2020 | Peper | G06F 40/30 |
| 2020/0293719 | A1* | 9/2020 | Suzuki | G06F 40/279 |
| 2020/0311341 | A1* | 10/2020 | Chaturvedi | G06F 40/30 |
| 2021/0064823 | A1* | 3/2021 | Fu | G06F 40/30 |

OTHER PUBLICATIONS

Extractive Summarization with SWAP-NET: Sentences andWords from Alternating Pointer Networks, Aishwarya Jadhav Indian Institute of Science Bangalore, India aishwaryaj@iisc.ac.in; Vaibhav Rajan School of Computing National University of Singapore (Year: 2018).*

A hierarchical self-attentive neural extractive summarizer via reinforcement learning (HSASRL); Farida Mohsen1 & Jiayang Wang1 & Kamal Al-Sabahi2; Published online: (Year: 2020).*

Sentence Boundary Detection in Legal Text; George Sanchez Thomson Reuters R&D 610 Opperman Dr. Eagan, MN 55123 FName. LName@TR.com (Year: 2019).*

Neural Methods for Sentiment Analysis and Text Summarization; Thien-Hoa Le (Year: 2020).*

Learning to Distract: A Hierarchical Multi-Decoder Network for Automated Generation of Long Distractors for Multiple-Choice Questions for Reading Comprehension; Maunendra Sankar Desarkar; Kaushal Kumar Maurya; Indian Institute of Technology Hyderabad India (Year: 2020).*

Text Classification Using a Bidirectional Recurrent Neural Network with an Attention Mechanism (Year: 2020).*

Hierarchical RNN with Static Sentence-Level Attention for Text-Based Speaker Change Detection (Year: 2018).*

Beeferman, D., Berger, A., & Lafferty, J. (1997). Text segmentation using exponential models. arXiv preprint cmp-ig/9706016.

Beeferman, D., Berger, A., & Lafferty, J. (1999). Statistical models for text segmentation. Machine learning, 34(1-3), 177-210.

Cieri, C., Graff, D., Liberman, M., Martey, N., & Strassel, S. (Feb. 1999). The TDT-2 text and speech corpus. In Proceedings of the DARPA Broadcast News workshop (pp. 57-60).

Fiscus, J., Doddington, G., Garofolo, J., & Martin, A. (Mar. 1999). NIST's 1998 Topic Detection and Tracking evaluation (TDT2). In Proceedings of the 1999 DARPA Broadcast News Workshop (pp. 19-24).

Hearst, M. A. (1997). TextTiling: Segmenting text into multi-paragraph subtopic passages. Computational linguistics, 23(1), 33-64.

Karypis, G. (2002). CLUTO—a clustering toolkit (No. TR-02-017). Minnesota Univ Minneapolis Dept of Computer Science.

Kim, S. (May 2019). Deep Recurrent Neural Networks with Layer-wise Multi-head Attentions for Punctuation Restoration. In ICASSP 2019-2019 IEEE International Conference on Acoustics, Speech and Signal Processing (ICASSP) (pp. 7280-7284). IEEE.

Misra, H., Hopfgartner, F., Goyal, A., Punitha, P., & Jose, J. M. (Jan. 2010). TV news story segmentation based or semantic coherence and content similarity. In International Conference on Multimedia Modeling (pp. 347-357). Springer, Berlin, Heidelberg.

Pennington, J., Socher, R., & Manning, C. (2014). Glove: Global vectors for word representation. In Proceedings of the 2014 conference on empirical methods in natural language processing (EMNLP) (pp. 1532-1543).

Tsunoo, E., Bell, P., & Renals, S. (2017). Hierarchical recurrent neural network for story segmentation. In Proc. of Interspeech.

Yamron, J. P., Carp, I., Gillick, L., Lowe, S., & van Mulbregt, P. (May 1998). A hidden Markov model approach to text segmentation and event tracking. In Acoustics, Speech and Signal Processing, 1998. Proceedings of the 1998 IEEE International Conference on (vol. 1, pp. 333-336). IEEE.

Yu, J., Xiao, X., Xie, L., Chng, E. S., & Li, H. (2016). A DNN-HMM Approach to Story Segmentation. In INTERSPEECH (pp. 1527-1531).

* cited by examiner

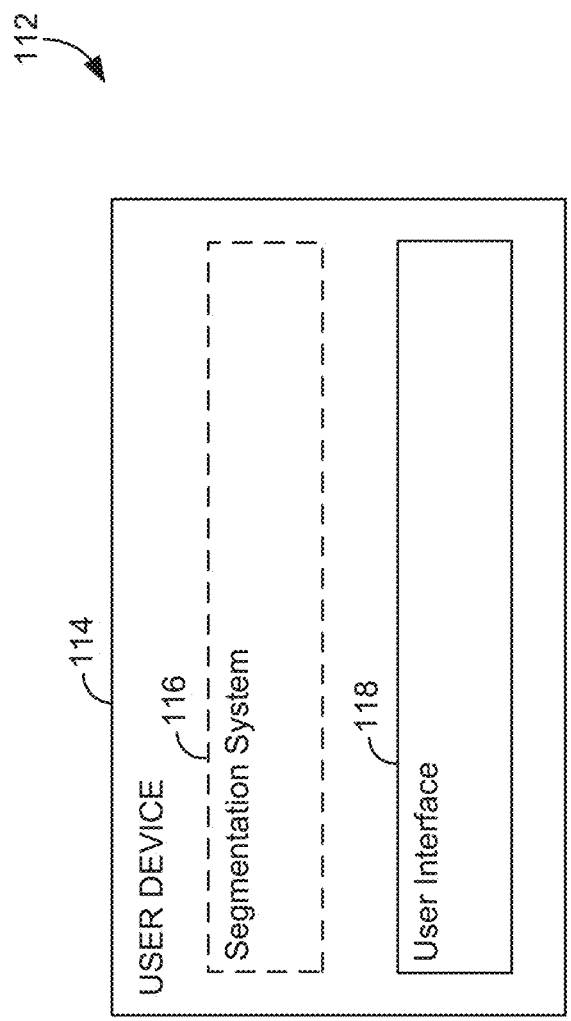

AUTOMATIC TEXT SEGMENTATION BASED ON RELEVANT CONTEXT

BACKGROUND

Oftentimes, it is desirable to partition a text into subparts. Partitioning a text into subparts may be desired or used for segmentation of multimedia contents, fine-grained level indexing of multimedia content, analyzing tutorial and/or live-streaming contents, natural language processing, speech applications, summarization, discourse analysis, and/or information extraction. Such text can be a document (e.g., PDF), a transcript (e.g., audio transcript), and/or any other written form. Subparts of a text can be segmented based on various levels of granularity (e.g., paragraphs, sentences, etc.). Subparts are typically based on a portion of the text having some type of relationship. For instance, sentences of a subpart might be related to the same topic. Subparts can be generated using text segmentation.

Traditional text segmentation systems typically implement a pipeline approach consisting of feature engineering and breakpoint detection to perform text segmentation. Features can be identified that capture topic and/or semantic information from a text. Features can be used to determine a shift in similarity and/or coherency in the text. Such features can be pre-defined as indicators of a breakpoint in the text (e.g., specific grouping of words, period, comma, etc.). When a feature indicating a breakpoint is determined, segmentation can be applied. In particular, the text can be segmented when a significant change or shift is detected in the features. However, such conventional text segmentation systems are limited as feature engineering is laborious and highly task-specific. Further, the features often capture limited semantic relationships in the text. These limited semantic relationships may not sufficiently cover all relationships in the text.

Improvements have been attempted using neural network-based models. Neural network-based models have attempted to leverage various forms of distributed representations (e.g., word vectors, sentence vectors, etc.) to represent topics and context of a text. For instance, neural network-based models—using a hierarchical recurrent neural network with Hidden Markov models—have be used to detect state changes in text indicative of a segmentation point. In particular, such networks can model topic transitions to identify story boundaries by determining changes in the topics assigned to each sentence in a text. However, such network-based models are not specifically tailored to text segmentation. In particular, such models equally leverage information from surrounding sentences to predict topics for sentences. This can result in using unrelated sentences to predict a topic, leading to less accurate predictions. As such, network-based models deployed using conventional approaches are not satisfactory for text segmentation tasks.

SUMMARY

Embodiments of the present disclosure are directed to facilitating text segmentation by identifying segmentation points that indicate a location at which to segment a text based on relevant context. One method available for creating such a system is using a neural network. Neural networks can be trained to assist in identifying segmentation points. In particular, a text segmentation neural network system can be trained to focus on relevant context while discounting irrelevant context. This is advantageous because focusing segmentation prediction on relevant content increases the accuracy of the prediction. Additionally, the neural network system can be trained to take into account similarity between sentences input into the system Training a neural network system can be accomplished using a modified, or enhanced, hierarchical recurrent neural network (HRNN) framework. In this regard, additional mechanisms added to modify the HRNN can optimize the text segmentation neural network system for performing text segmentation. These additional mechanisms can include an attention mechanism, similarity matching mechanism, and/or a topic-segmentation joint label mechanism. To train the text segmentation neural network system, differences between the output label and a ground-truth label are used to determined errors in the text segmentation neural network system. Such errors can be used to improve the text segmentation neural network system by backwards propagation of the errors through the text segmentation neural network system.

BRIEF DESCRIPTION OF THE DRAWINGS

FIG. 1B depicts an example configuration of an operating environment in which some implementations of the present disclosure can be employed, in accordance with various embodiments.

DETAILED DESCRIPTION

Figure 1A:
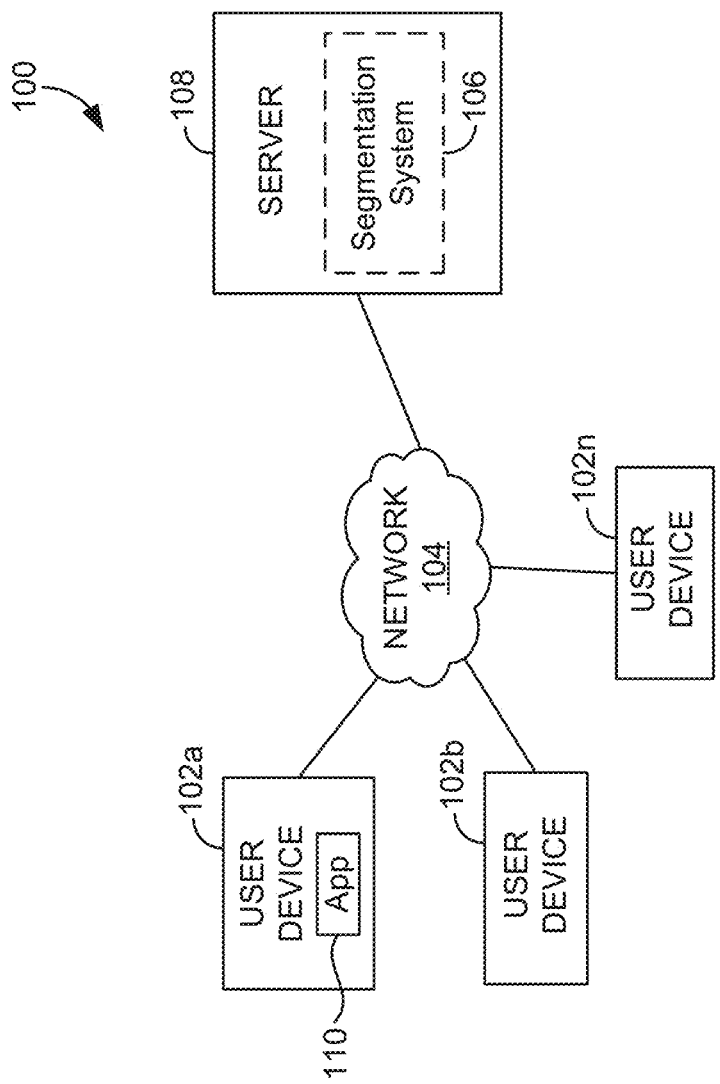
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

When partitioning a text into subparts, it is desirable to accurately group the text into the different subparts. Subparts should be comprised of related portions (e.g., sentences, paragraphs, etc.). For instance, a subpart can be a grouping of portions about a particular topic, such as, for example: sports, art, politics, etc. By identifying transitions in a text, the text can be partitioned into the subparts. Such transitions can be based on shifts in topics or text features.

Traditional text segmentation systems use a pipeline approach to identify such transitions in a text. This pipeline is based on feature engineering and breakpoint detection to identify the transitions. However, these traditional systems are limited in success as feature engineering is laborious and highly task-specific. To reduce the amount of manual time and effort spent to generate pipeline-based text segmentation systems, techniques have been developed using neural network-based models. Yet, such models are limited in application. In particular, these network-based models focus on modeling an overall transition of sentences and stories based on a sequence of sentences to predict a topic label for an input sentence. These labeled sentences can then be analyzed to predict story boundaries based on shifts in topic from sentence to sentence. However, this modeling equally leverages information from all surrounding sentences to predict the topic labels for an input sentence. This can result in using unrelated sentences to predict a topic. For instance, if the input sentence is near the beginning or end of a portion of the text, not all the surrounding sentences relate to the same portion (e.g., a surrounding sentence can relate to a different topic. This can result in predicting an incorrect topic of the input sentence.

Accordingly, embodiments of the present disclosure are directed to facilitating text segmentation using a neural network system specifically trained for identifying segmentation points in a text by focusing on relevant context while discounting irrelevant context. Advantageously, sentences irrelevant to the target input sentences can be down-weighted to obtain better context representation vectors. Additionally, the neural network system can be trained to take into account similarity between sentences to more accurately identify segmentation points in the text. For instance, high similarity can be indicative that there is not a segmentation point whereas low similarity can be indicative that there should be a segmentation point. Further, to add additional context in identifying segmentation points, a joint label can be used. This joint labeling can be advantageous because it leverages a combination of topic information and a likelihood of a segmentation point based on cue-words indicating a likely segmentation point in making a segmentation determination between sentences rather than solely relying on assigning topics to sentences.

At a high-level, the text segmentation neural network system takes advantage of the fact that text often comprises topically coherent subparts. In particular, text often includes multiple subparts (e.g., stories, segments, parts, etc.). Each subpart of a text can comprise sentences with a logical order. Further, the words that make up the sentences often relate to the particular subpart (e.g., a subpart about sports often has sentence that relate to sports). In this way, as the text transitions from subpart to subpart, each subpart can have multiple sentences with words relevant to that subpart. When performing text segmentation, embodiments of the present disclosure take advantage of the transitions between sentences and/or subparts, context of sentences, relevance of the sentences, and/or similarity between the sentences.

To perform text segmentation, data can be input into a text segmentation neural network system. This data can be a set of sentences from a text. The set of sentences can be designated using a window size that indicates a number of sentences (e.g., target sentences and context sentences that surround the target sentences) to be input from the text into the text segmentation neural network system. The target sentences can be designated as a past target sentence located prior to a decision point and a future target sentence located after the decision point. The decision point indicates a point in the data that the text segmentation neural network system analyzes to determine whether to identify a decision point as a segmentation point in the text. In this way, the decision point is between the two target sentences. Context sentences are the group of sentences that surround the target sentences in the past (or previous) and future directions. The context sentences can be used to provide additional context during the analysis of whether to perform segmentation at the decision point.

As mentioned, text segmentation can be performed using a text segmentation neural network system. A neural network generally refers to a computational approach using large clusters of connected neurons. Neural networks are self-learning and trained rather than explicitly programmed so that a generated output reflects a desired result. As described herein, a text segmentation neural network system can utilize a modified hierarchical recurrent neural network (HRNN) framework. The modified HRNN can use two layers of long short-term memory (LSTM) to extract two layers of information from input data. In particular, the first layer of the HRNN can be designated as a word-level LSTM layer used to output sentence vectors for each sentence input into the text segmentation neural network system. The second layer of the HRNN can be designated as a sentence-level bi-directional LSTM layer used to update the hidden state of the sentence vectors from word-level LSTM layer with the context from the sequence of sentences that were input into the text segmentation neural network system.

Additional mechanisms added to the HRNN can optimize the text segmentation neural network system for performing text segmentation based on decision points identified as segmentation points in the text. These additional mechanisms can include an attention mechanism, similarity matching mechanism, and/or a topic-segmentation joint label mechanism. The attention mechanism can be used to improve the performance of text segmentation by enabling the text segmentation neural network system to focus on relevant inputs while discarding or deemphasizing irrelevant inputs. The similarity matching mechanism can be used to explicitly add similarity information to the text segmentation neural network system. Such similarity information is indicative of comparisons of similarity between context vectors and topic sentence vectors. The topic-segmentation joint label mechanism can combine segmentation labeling and topic labeling when making the determination of whether a decision point should be segmented. Combining these labels results in a representation of both topic information and lexical cues from the sentences.

Training such a text segmentation neural network system can use input data comprising a window of sentences (e.g., target sentences and context sentences surrounding a decision point) and topic identifiers (i.e., topic IDs) corresponding to each sentence in the window. For instance, a set of sentences along with corresponding topic IDs for the sentences can be run through the text segmentation neural network system. The text segmentation neural network system can then output a label (e.g., a joint label) for the decision point. A label can be any manner of identifying whether or not the decision point is a segmentation point. A label can be based on features indicative of a transition in the text and/or on a transition in topics. In particular, a joint label can be used that leverages a combination of both topic information and the likelihood that the decision point is a segmentation point. Errors in the output label generated by the text segmentation neural network can be determined using loss (e.g., cross entropy loss) such that the errors can be fed back through the network to appropriately train the system. For instance, errors can be fed back through the network by adjusting the weight of network connections (e.g., adjusting weights of network parameters) to reduce the value of the error. In this way, the network architecture remains the same but the weights of the network connections are retrained during each iteration of training to reduce errors. The process of training the system can be repeated for a sufficiently large number of cycles, until the text segmentation neural network system converges to a state where the error is small enough such that the output produced reaches a desired threshold minimum of loss between input data and output labels.

Such a trained text segmentation neural network system can be used to analyze a text for segmentation at decision points. For instance, data (e.g., sets of sentences) from the text can be input into a trained text segmentation neural network system. The text can be input such that decision points are analyzed after each sentence in the text. In this way, the text segmentation neural network system can generate labels for the decision points of the text. These labels can indicate whether or not to segment the text at a particular decision point. By applying these labels, the text can be segmented into subparts.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) 110 may generally be any application capable of facilitating the exchange of information between the user devices and the server(s) 108 in carrying out text segmentation. In some implementations, the application(s) comprises a web application, which can run in a web browser, and could be hosted at least partially on the server-side of environment 100. In addition, or instead, the application(s) can comprise a dedicated application, such as an application having text segmentation functionality. In some cases, the application is integrated into the operating system (e.g., as a service). It is therefore contemplated herein that "application" be interpreted broadly. For instance, the application(s) can be related to segmentation of multimedia contents, fine-grained level indexing of multimedia content, analyzing tutorial and/or live-streaming contents, natural language processing, speech applications, summarization, discourse analysis, and/or information extraction. For instance, implementing text segmentation can help a user understand a PDF, figure out reading order, and/or be used in summarizing a document (e.g., PDF).

In accordance with embodiments herein, the application 110 can facilitate text segmentation. In some cases, a user can select or input a text. A text can be selected or input in any manner. For example, a user may select a desired text from a repository, for example, stored in a data store accessible by a network or stored locally at the user device 102a. In other cases, a text may be automatically selected or detected (e.g., from a webpage or text writing environment). Based on the input text, (e.g., provided via a user device or server), text segmentation can be performed to determine subparts of the text. The subparts determined based on identified segmentation points can be provided, for example, to the user via the user device 102a. In this regard, the subparts can be displayed via a display screen of the user device. As can be appreciated, in some cases, additionally or alternatively, subparts may not be presented but rather utilized (e.g., by a service) to provide other information or perform a function.

As described herein, server 108 can facilitate text segmentation via segmentation system 106. Server 108 includes one or more processors, and one or more computer-readable media. The computer-readable media includes computer-readable instructions executable by the one or more processors. The instructions may optionally implement one or more components of segmentation system 106, described in additional detail below.

Segmentation system 106 can train and operate a neural network system in order to segment a text. Such a neural network system can be comprised of one or more neural networks trained to generate a designated output. For example, a neural network system can utilize a modified HRNN framework. Additional mechanisms added to the HRNN can optimize the text segmentation neural network system for text segmentation. These additional mechanisms can include an attention mechanism, similarity matching mechanism, and/or a topic-segmentation joint label mechanism. The modified HRNN and its additional mechanisms are discussed in further detail with reference to FIGS. 2 and 4. Further, when training or operating the neural network system, sentences of the input text linked with corresponding topic IDs. Incorporating topic IDs during training of the neural network system ensures the system learns to assign labels based, not only on likelihood of a segmentation point based on sentence features (e.g., features that relate to the presence of cue-words indicative a likely segmentation point) but also based on a shift in topics.

In implementations (e.g., cloud-based implementations), the instructions on server 108 may implement one or more components of segmentation system 106, and application 110 may be utilized by a user to interface with the functionality implemented on server(s) 108. In some cases, application 110 comprises a web browser. In other cases, server 108 may not be required. For example, the components of segmentation system 106 may be implemented completely on a user device, such as user device 102a. In this case, segmentation system 106 may be embodied at least partially by the instructions corresponding to application 110.

Thus, it should be appreciated that segmentation system 106 may be provided via multiple devices arranged in a distributed environment that collectively provide the functionality described herein. Additionally, other components not shown may also be included within the distributed environment. In addition, or instead, segmentation system 106 can be integrated, at least partially, into a user device, such as user device 102a. Furthermore, segmentation system 106 may at least partially be embodied as a cloud computing service.

Referring to FIG. 1B, aspects of an illustrative segmentation system is shown, in accordance with various embodiments of the present disclosure. FIG. 1B depicts a user device 114, in accordance with an example embodiment, configured to allow for text segmentation. The user device 114 may be the same or similar to the user device 102a-102n and may be configured to support the segmentation system 116 (as a standalone or networked device). For example, the user device 114 may store and execute software/instructions to facilitate interactions between a user and the segmentation system 116 via the user interface 118 of the user device.

A user device can be utilized by a user to facilitate text segmentation. In particular, a user can select and/or input a text to segment utilizing user interface 118. A text can be selected or input in any manner. The user interface may facilitate the user accessing one or more stored texts on the user device (e.g., in a text library), and/or import text from remote devices and/or applications. Based on the selected text, segmentation system 116 can be used to segment the selected text using various techniques, some of which are further discussed below. User device 114 can also be utilized for displaying the subparts of the text after identifying segmentation points (e.g., using joint labeled decision points).

Figure 2:
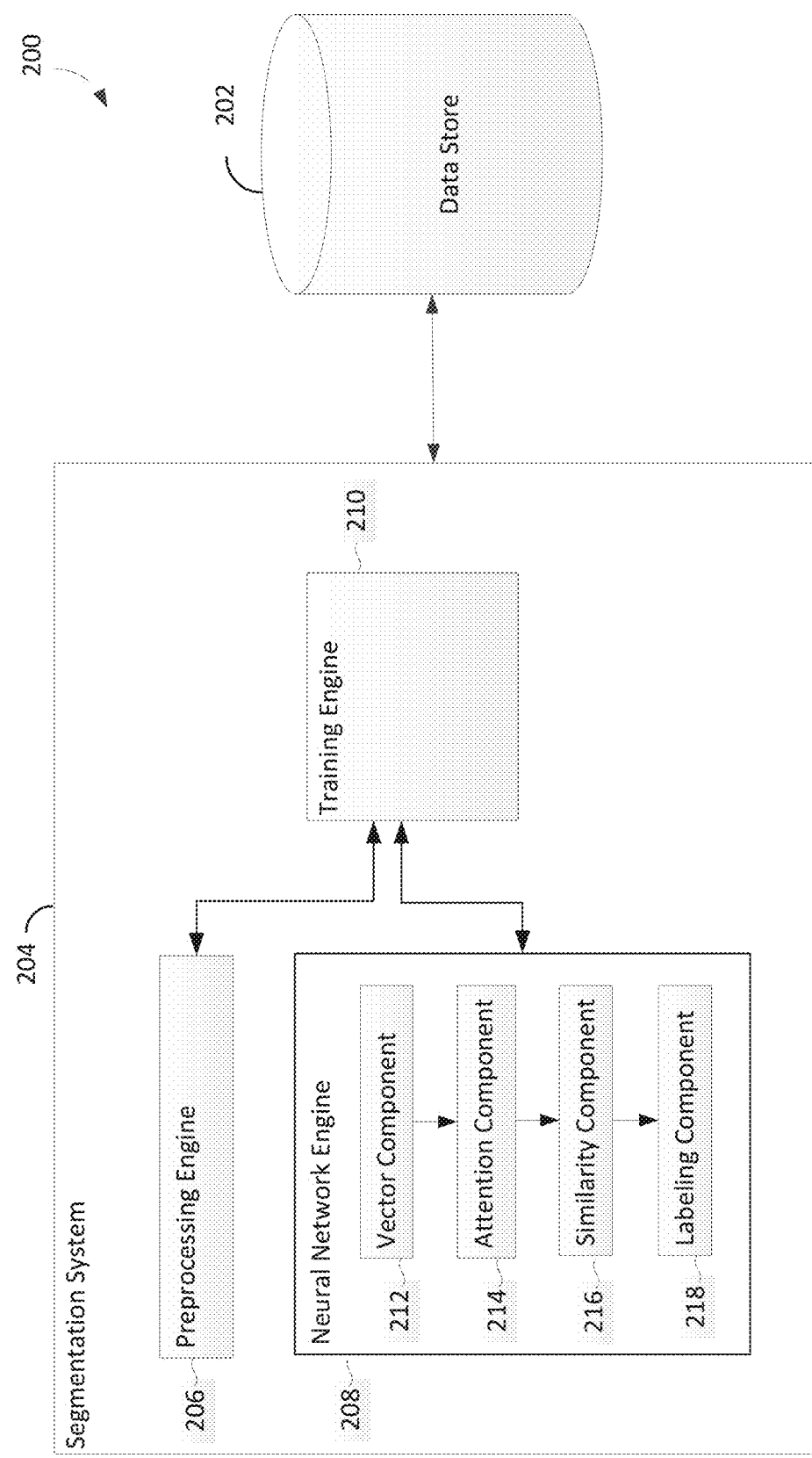
FIG. 2 depicts an example configuration of an operating environment in which some implementations of the present disclosure can be employed, in accordance with various embodiments of the present disclosure.

Referring to FIG. 2, aspects of an illustrative text segmentation environment 200 are shown, in accordance with various embodiments of the present disclosure. Segmentation system 204 includes preprocessing engine 206, neural network engine 208, and training engine 210. The foregoing engines of segmentation system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the segmentation system.

As shown, a segmentation system can operate in conjunction with data store 202. Data store 202 can store computer instructions (e.g., software program instructions, routines, or services), data, and/or models used in embodiments described herein. In some implementations, data store 202 can store information or data received via the various engines and/or components of segmentation system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 can include training data. Training data generally refers to data used to train a neural network system, or portion thereof. As such, training data can include a text dataset. Such a text dataset can be used for training a neural network system (e.g., text segmentation neural network system). The text dataset can be input into data store 202 from a remote device, such as from a server or a user device. This text dataset can be stored in a raw form and/or in a processed form. Processing a text dataset can include normalizing the text, removing stop words, and separating the processed text into sentence segments. Processing of the text dataset is further described with reference to preprocessing engine 206. Further, the text dataset can be stored with the words of the text dataset converted into word vectors. In addition, training data can include topic IDs that correspond to each segment of the text dataset.

Data store 202 can also be used to store a neural network system during training and/or upon completion of training. Such a neural network system can be comprised of one or more neural networks and/or neural network systems. For example, the neural network system can be a modified HRNN with various specialized text segmentation mechanisms (e.g., attention mechanism, similarity matching mechanism, and/or a topic-segmentation joint label mechanism).

Segmentation system 204 can generally be used for segmenting a text. Specifically, the segmentation system can be used to process data for input into a text segmentation neural network system, to train a text segmentation neural network system, and/or implement a trained text segmentation neural network system. In accordance with embodiments described herein, the segmentation system can be run using, for example, a modified HRNN with various specialized text segmentation mechanisms (e.g., via neural network engine 208). The segmentation system can be used to segment a text at identified segmentation points based on joint labels assigned to decision points in the text.

Preprocessing engine 206 can be used to process information used to train and/or implement a text segmentation neural network system. In embodiments, the preprocessing engine can receive a text dataset for use in training the text segmentation neural network system. A text dataset can be a conglomeration of text such as transcripts or manuscripts having distinct subparts, stories, and/or segments. The text dataset can be received from data store 202 and/or from a remote device, such as from a server or a user device. In other embodiments, the preprocessing engine can receive a text to process for segmentation using a trained text segmentation neural network system. The text can be received from data store 202 and/or from a remote device, such as from a server or a user device.

Preprocessing engine 206 can be used to process text (e.g., a text dataset and/or a text for segmentation) in preparation for input into the text segmentation neural network system. Processing the text dataset can include normalizing the text, removing stop words, and separating the processed text into sentence segments. In particular, normalization can remove accents from the text, convert the text to a single case, remove non-alphanumeric characters, etc. The removal of stop words results in a text without words that do not typically impart additional meaning to a sentence (e.g., the, a, an, in, etc.). After normalization and the removal of stop words, the text can then be split into sentences. Splitting the text into individual sentences allows sets of sentences to be input into the text segmentation neural network system. In some embodiments, when preprocessing text for segmenting using a previously trained text segmentation neural network system, the text can undergo less preprocessing (e.g., stop words are not removed).

Preprocessing engine 206 can also convert words of the text into word vectors. Neural networks have difficulty in processing words in raw form. Converting words into vectors allows for more effective and efficient analysis by the text segmentation neural network system.

Further, the preprocessing engine can divide the text dataset of the training data into a training set, a validation set, and a test set. The training set can be used to train a text segmentation neural network system. The validation set can be used to assess the text segmentation neural network system to determine optimal hyper-parameters (e.g., number of hidden units, number of epochs, loss, etc.). The validation set can help determine what model of the text segmentation neural network system, with which parameters, to use as the final model for the text segmentation neural network system. Finally, the test set can be used to assess the final trained text segmentation neural network system. In this way, first, the training set can be used to train a text segmentation neural network system, and the validation set can be used to assess the text segmentation neural network system. Training and validation can be further performed using a different configuration of the text segmentation neural network system. These configurations can be compared to choose optimal configuration of the text segmentation neural network system. Finally, the test set can be used to evaluate and report the performance of the optimal configuration of the text segmentation neural network system.

Preprocessing engine 206 can also assign topics to each sentence of a text for use in training the text segmentation neural network system. Topics can be assigned using topic IDs that correspond to each sentence of the text. For instance, when a text dataset based on broadcast news programs is used, sentences of the broadcast text can be assigned to different topics (e.g., weather, politics, sports, etc.).

Neural network engine 208 can be used to implement a neural network system (e.g., a text segmentation neural network system). Neural network engine 208 can include vector component 212, attention component 214, similarity component 216, and labeling component 216. The foregoing components of neural network engine 208 can be implemented, for example, in operating environment 100 of FIG. 1A and/or operating environment 112 of FIG. 1B. In particular, those components may be integrated into any suitable combination of user devices 102a and 102b through 102n and server(s) 106 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the neural network engine.

In embodiments, neural network engine 208 can operate in conjunction with training engine 210 to train a neural network system. Such a neural network system can be a text segmentation neural network system. As depicted in FIG. 2, training engine 210 can interact with vector component 212, attention component 214, similarity component 216, and labeling component 216 during the training of a text segmentation neural network system.

Vector component 212 can be used to extract information from input data. In particular, the vector component can generate sentence vectors for sentences input into the text segmentation neural network system. These sentence vectors can then be used to generate a single vector encoded with context from the sequence of sentences. This single vector can be used to assign a label to a decision point indicating whether the decision point is a segmentation point. The vector component can receive data from preprocessing engine 206 and/or data processed using preprocessing engine 206 and stored in data store 202. The input data analyzed by the vector component can include a set of sentences. The set of sentences can be designated using a window size. The window size can be indicative of a desired number of context sentences on each side the target sentences surrounding a decision point. For instance, when the window size is four, ten sentences act as the data input into the text segmentation neural network system. In particular, for a window size of four, of the ten sentences, four sentence serve as past context sentences, one sentence serves as a past target sentence, one serves as a future target sentence, and four serve as future context sentences. A decision point is located between the past target sentence and the future target sentence. This decision point indicates the point in the data input that the text segmentation neural network system analyzes to determine whether or not there is a segmentation point in the text.

The vector component can be implemented using a HRNN framework. The HRNN can use two layers of LSTM to extract two layers of information from the input data. Input data can be comprised of text processed into word vectors. For instance, each word of the text input into the system can be preprocessed into a word vectors. A word-level LSTM layer can be used to generate a sentence vector for each sentence of the input data using the word vectors. The sentence vector concentrates the information and context from each word vector of a given sentence from the input text. Such information and context can be based on features of sentence, what topic a sentence relates to, and/or any other context. The second layer of the HRNN can be designated as a sentence-level bi-directional LSTM layer. The sentence-level bi-directional LSTM layer can be used to update the hidden state of the sentence vectors with the context from the entire sequence of sentences from the input data. For instance, the sentence-level bi-directional LSTM layer updates the sentence vectors for each sentence to include context from the past future context sentences, the target sentences, and the future context sentences. Such context can be based on features of the sentences, what topic the sentences relate to, and/or any other type of context. In this way, the sentence-level bi-directional LSTM layer generates context-based sentence vectors for the sentences input into the system.

Attention component 214 can be used to focus on relevant inputs by discarding and/or deemphasizing irrelevant inputs from input data (e.g., using only context-based sentence vectors from context sentences relevant to a target sentence but not a context-based sentence vector from a context sentence unrelated to the target sentence). In particular, the attention component can receive context-based sentence vectors generated by the sentence-level bi-directional LSTM layer from the context sentences. These context-based sentence vectors are encoded with context from the sequence of sentences from the input data (e.g., from vector component 212).

Attention component 214 can weigh the context-based sentence vectors based on whether a context sentence is relevant to a target sentence. In particular, the attention component can be used to determine whether to down weight the context-based sentence vectors bases on whether a context sentence is related to the corresponding target sentence (e.g., past content sentence related to past target sentence). A context sentence vector and a target sentence vector can be compared using the generated context-based sentence vectors generated using the sentence-level bi-directional LSTM layer. A weight can then be assigned to the context-based sentence vector for the context sentence based on the relationship between the sentences. Such a comparison uses parameters determined by the text segmentation neural network system to determine similarity between the context sentence vector and a target sentence vector. In this way, the attention component can down weight a context sentence unrelated to a target sentence. Down weighting unrelated context sentence focuses on the contribution by relevant context sentences. For example, past context-based sentence vectors that the attention layer determines are unrelated to the past target sentence can be deemphasized. Such weighting can fully deemphasize a context sentence (e.g., weight of 0) or only partially deemphasize a context sentence (e.g., weight of 0.3).

Upon assigning weights to each context-based sentence for the context sentence, the weighted context-based sentence vectors can be used to obtain a weighted sum. In particular, a weighted sum can be obtained for the past context sentences and for the future sentence vectors. In this way, sentences irrelevant to the target sentences are downweighted in this weighted sum to obtain better context vectors (e.g., a context vector representing the past context sentences and a context vector representing the future context sentences).

Similarity component 216 can be used to explicitly add similarity information to the text segmentation neural network system. Similarity information can be based on a comparison between combinations of the context vectors and the target vectors to determine differences (e.g., comparing each combination of the context vectors and the target vectors). Differences (and similarities) between the context vectors and the target vectors can be indicated using similarity scores determined using distributed representations. The context vectors can be the weighted sums of the context-based sentence vectors (e.g., representing the past and future context sentences). The target vectors can be the context-based sentence vectors generated using the sentence-level bi-directional LSTM layer for the target sentences. These target vectors are not weighted by the attention component. After measuring similarity using distributed representations between each pair of the content and target sentence vectors, the similarity can be concatenated as a six-dimensional distance vector. Similarity between the vectors can be determined using any variety of methods, as discussed further with reference to FIG. 4.

Labeling component 216 can be used to label a decision point(s) in input data. A label can be any manner of identifying a whether or not the decision point is a segmentation point or not. A label can be based on features indicative of a transition in the text and/or based on a transition in topic. For instance, a topic-segmentation joint label can be used that combines both segmentation labeling and topic labeling into a single label. These joint labels can indicate whether or not to segment the text at a particular decision point. The joint labels can be based on a combination of a change in topics associated with the decision point as well as an indication whether the decision point is likely a segmentation point based on other parameters identified by the system.

Training engine 210 can be used to adjust the text segmentation neural network system by changing at least one node parameter. Training engine 210 can interact with the components of neural network engine 208 during training of the text segmentation neural network.

The text segmentation neural network system can comprise a plurality of interconnected nodes with a parameter, or weight, associated with each node. Each node can receive inputs from multiple other nodes and can activate based on the combination of all these inputs, for example, when the sum of the input signals is above a threshold. The parameter can amplify or dampen the input signals. For example, a parameter could be a value between 0 and 1. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

Figure 3:
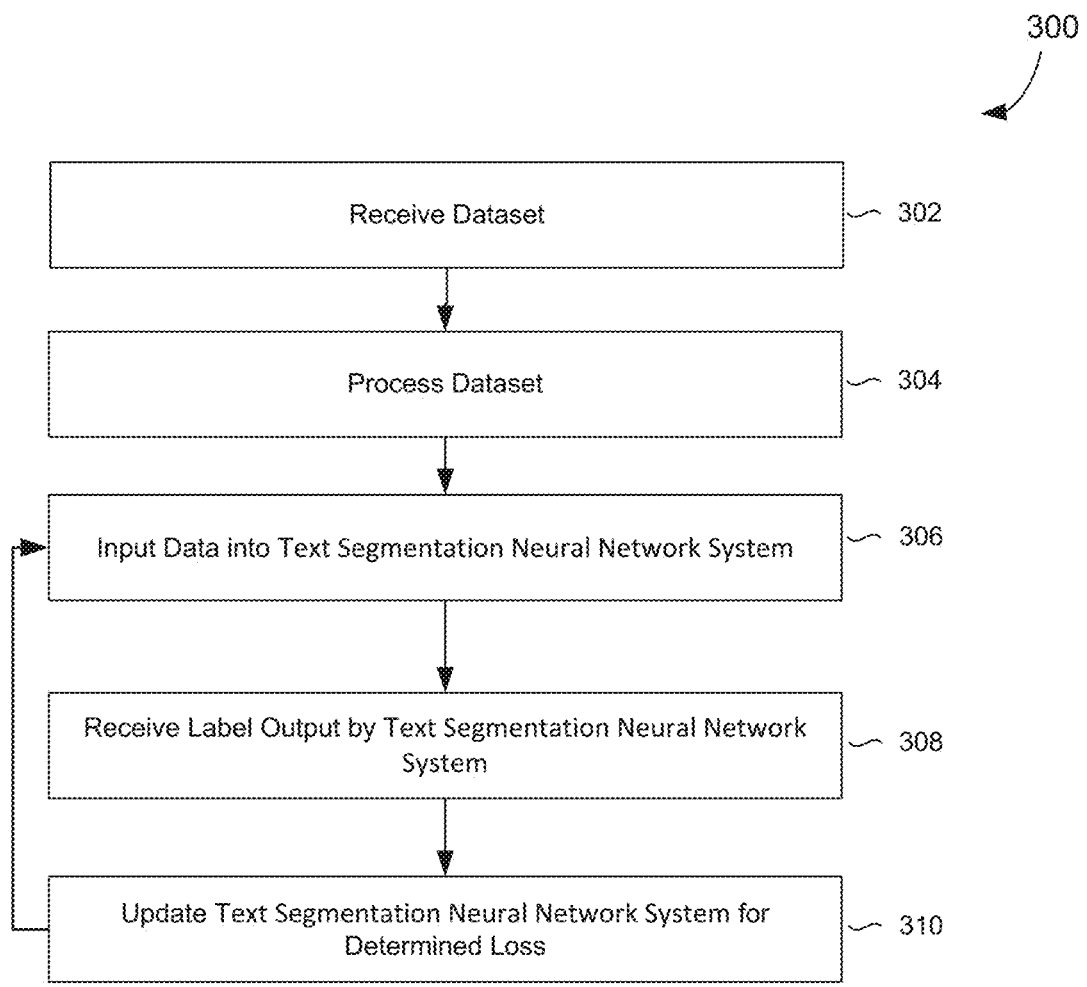
FIG. 3 depicts a process flow showing an embodiment of a method for training a text segmentation neural network system, in accordance with embodiments of the present disclosure.

With reference to FIG. 3, a process flow is provided showing an embodiment of method 300 for training a text segmentation neural network system, in accordance with embodiments of the present disclosure. Aspects of method 300 can be performed, for example, by neural network engine 208 (e.g., comprising vector component 212, attention component 214, similarity component 216, and labeling component 218) in conjunction with training engine 210 as illustrated in FIG. 2.

At block 302, a dataset can be received for use in training the text segmentation neural network system. A dataset can be a conglomeration of text such as transcripts or manuscripts having distinct subparts (e.g., stories, segments, parts, etc.). For instance, a dataset can be comprised of transcripts from broadcast news programs. Such a dataset can contain distinct subparts related to various news portions of the broadcast (e.g., sports, politics, weather, etc.). Each subpart of the dataset can comprise sentences with a coherent order. Further, the words that make up the sentences of a subpart often relate to the topic of the particular subpart (e.g., a subpart about sports typically has sentence that relate to sports). As an example, the dataset can be received from an online depository (e.g., Topic Detection and Tracking (TDT2) dataset). In other embodiments, a user can input a dataset stored on a local system At block 304, the dataset can be processed. Processing can be carried out to prepare the text of the dataset for use in training the text segmentation neural network system. In an embodiment, the text can be normalized into a single canonical form. Normalization can remove accents from the text, convert the text to a single case, remove non-alphanumeric characters, etc. The text can also have stop words removed. The removal of stop words can occur as part of normalization or as a separate processing step. Stop words typically do not impart additional meaning to a sentence (e.g., the, a, an, in, etc.). The text can then be split into sentences. Designating sentences in the text allows separate sentences to be used to train the text segmentation neural network system.

The dataset can undergo further processing by converting the words of the text into word vectors. Neural networks have difficulty in processing words in raw form. Converting words into vectors allows for more effective and efficient analysis by the text segmentation neural network system. Words can be converted to vectors using a pre-trained system (e.g., GloVe model trained using Common Crawl data).

Further, the dataset can be divided into a training set, a validation set, and a test set. The training set can be used to train a text segmentation neural network system. The validation set can be used to assess the text segmentation neural network system to determine optimal hyper-parameters (e.g., number of hidden units, number of epochs, loss, etc.). The validation set can help determine what model of the text segmentation neural network system, with which parameters, to use as the final model for the text segmentation neural network system. Finally, the test set can be used to assess the final trained text segmentation neural network system.

The dataset can also be processed to assign topics to each sentence of the text. Topics can be assigned to each sentence of the text using topic IDs. For instance, when a dataset based on broadcast news programs is used, portions of the broadcast text are related to different topics (e.g., weather, politics, sports, etc.). These topics can be assigned to the sentences. Using topic IDs during training of the text segmentation neural network system ensures the system learns to assign labels to decision points based not only on likelihood of a break point but also based on a shift in topics.

Any number of topics can be designated when assigning topic IDs to the segments. The number of topics can be based on the complexity of the dataset such that an optimized number is used (e.g., 150 topic IDs for the TDT2 dataset).

Topic IDs can be assigned using any number of techniques. In one embodiment, unsupervised clustering can be used to assign topic IDs to the text segments. Such unsupervised topic clustering can be performed by maximizing an intra-cluster similarity and minimizing an inter-cluster similarity (e.g., using, for example, CLUTO). In this way, each segment of the text can be assigned a corresponding topic ID.

At block 306, data can be input into the text segmentation neural network system. Input data can include 2w+2 sentences consisting of 2 target sentences and 2w context sentences (e.g., w indicating a window size). The target sentences can be designated as a past target sentence located on one side of a decision point and a future target sentence located on the other side of the decision point. The decision point is the point at which the text segmentation neural network system assigns a label (e.g., a joint label indicating a combination of a topic ID and whether the decision point is a segmentation point based on features indicative of cue-words). The 2w context sentences can be used to provide additional context during the analysis of whether to indicate segmentation at the decision point. These context sentences are in both past and future directions from the target sentences surrounding the decision point with w indicating a window size. A window size designates the window of text selected for input. The sentences within the window size can be input as a dataset to train the text segmentation neural network system. For instance, when the window size is four, ten sentences act as the data input into the text segmentation neural network system. With a window size of four, there are two target sentences, one on each size of a decision point, and four sentences in the past direction and four sentences in the future direction.

During training, corresponding topic IDs for the sentences in the input data can also be input into the text segmentation neural network system. In embodiments, during training, sentences of the input text can be linked with corresponding topic IDs. Incorporating topic IDs during training of the neural network system ensures the system learns to assign labels to a decision point based, not only on likelihood of a break point but also based on a shift in topic. In particular, training the text segmentation neural network system using topics results in sentence vectors being generated that are encoded with features related to different topics. These topic features are in addition to the encoding of features related to cue-words indicative of a segmentation point.

At block 308, a label output by the text segmentation neural network system can be received. In embodiments, the label can be a topic-segmentation joint label that combines features related to segmentation labeling and topic labeling to identify segmentation points. Such a joint label can indicate whether or not a text should be segmented at a particular decision point based on features related to cue-words indicative of a segmentation point and/or features related to a topic ID associated with the decision point. In this way, a joint label is assigned to a decision point based on a combination of topic and likelihood of being a segmentation point. For example, when there are 150 topic IDs, there are 300 possible joint labels that can be assigned by the text segmentation neural network system. In particular, a label can be assigned using a 300 dimension vector indicative of how likely each joint label applies to the decision point. In such a dimension vector, a particular output can indicate what topic is associated with the decision point (e.g., based on features associated with a topic) and whether or not the decision point is likely a segmentation point (e.g., based on features associated with cue-words indicative of a segmentation point).

At block 310, the label output by the text segmentation neural network system can be evaluated for error and used to update the system. In particular, to update the system, error can be found by comparing the output label with a ground-truth label. A ground-truth label can be the desired output by the system. For example, if a decision point is known to have the topic ID "sports" and is a segmentation point, this can act as the ground-truth label. Such a ground-truth label can be represented using, for instance, the same form as the 300 dimension vector output by the text segmentation neural network system. In this way, differences between the output label and the ground-truth label can be determined. Such differences indicate error in the system.

In an embodiment, error can be determined and updated by finding loss and updating the neural network system using an optimizer. Optimizers attempt to find optimum weights, minimize error, and maximize accuracy in a neural network system. In an embodiment, error can be determined and updated for each iteration of training using a cross-entropy objective with an adaptive moment estimation (i.e., Adam) optimizer. The Adam optimizer can compute individual learning rates for different parameters of the neural network system during the training process. In particular, the Adam optimizer can use estimations of first and second moments of a gradient to adapt a learning rate for each weight in the neural network system. To estimate the moments, Adam can utilize exponentially moving averages that are computed on a gradient and evaluated for a current group of data input into the system.

Cross-entropy loss measures the performance of a neural network system that operates as a classification model. In particular, cross-entropy loss can be an output with a probability value between 0 and 1. Cross-entropy loss increases as the predicted probability diverges from the actual label. A perfect model would have a loss of 0.

Upon determining cross-entropy loss, the errors in the text segmentation neural network system can be fed back through the network to appropriately train the network. For instance, errors can be corrected by adjusting weights of network connections (e.g., adjusting weights of network parameters) to reduce the value of the error. In embodiments, a learning weight of 0.001 can be used. This learning weight indicates the maximal amount for which the neural network system is adjusted per training iteration. In this way, the network architecture can remain the same, but the weights of the network parameters can be retrained during an iteration of training to reduce errors.

The process of training the text segmentation neural network system and updating for error can be repeated for a sufficiently large number of cycles, until the system converges to a state where the error is small enough such that the output (e.g., joint label) reaches a desired threshold minimum of loss. In embodiments, the text segmentation neural network system can further undergo validation iterations. This testing and validation can also be repeated for a sufficiently large number of cycles, until the system converges to a state where the error is small enough such that the output (e.g., label) output reaches a desired threshold minimum of loss. Upon determining a text segmentation neural network system with minimized error, testing of the system can be performed to determine the success of the system.

Figure 4:
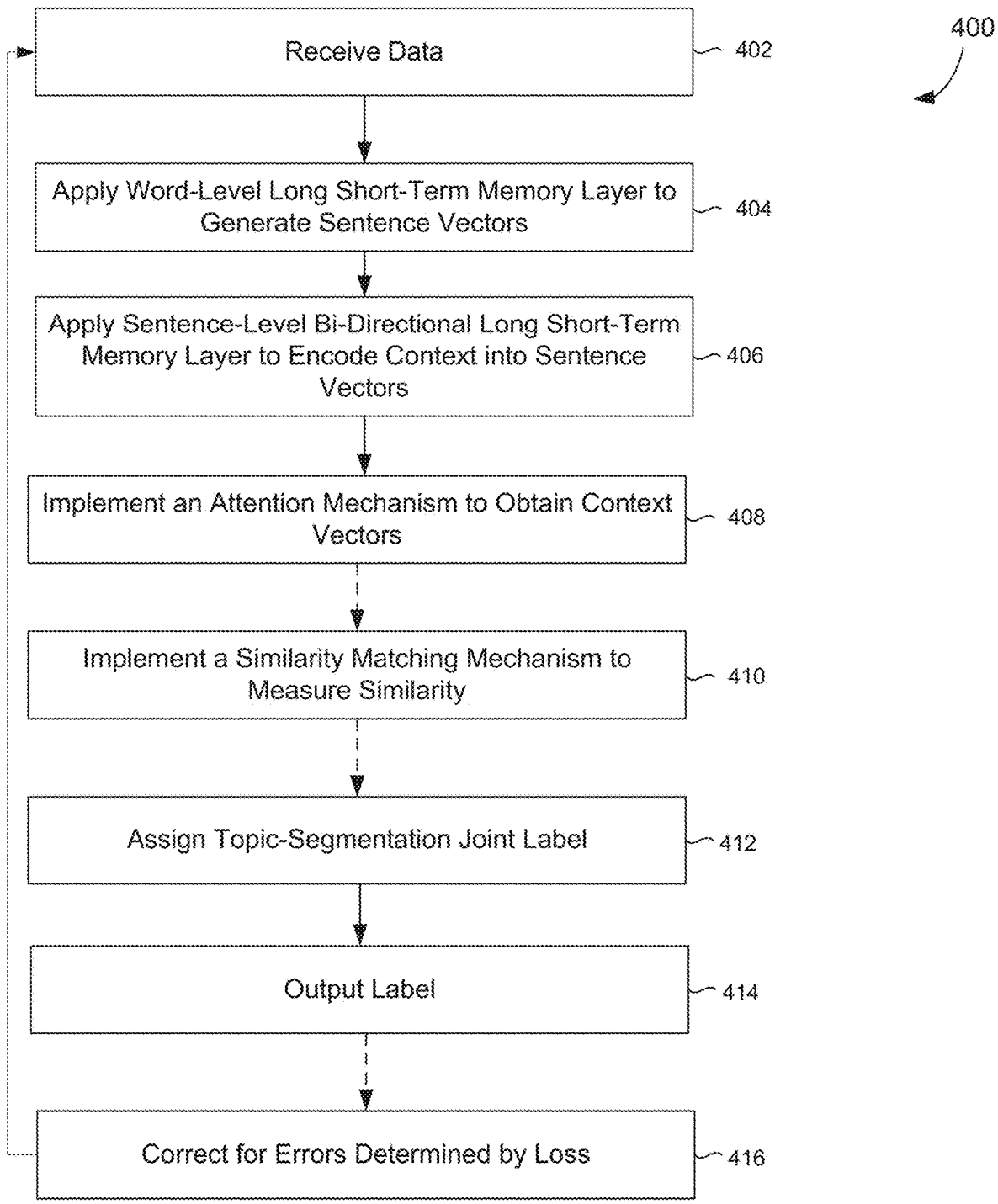
FIG. 4 depicts a process flow showing an embodiment of a method for training and/or utilizing a text segmentation neural network system to label decision points in a text, in accordance with embodiments of the present disclosure.

With reference to FIG. 4, a process flow is provided showing an embodiment of method 400 for training and/or utilizing a text segmentation neural network system to label decision points in a text, in accordance with embodiments of the present disclosure. Aspects of method 400 can be performed, for example, by neural network engine 208 (e.g., comprising vector component 212, attention component 214, similarity component 216, and labeling component 218) and/or training engine 210 as illustrated in FIG. 2.

A text segmentation neural network system trained and/or used in method 400 can be based on a modified HRNN framework. In particular, additional mechanisms have been added to the HRNN to optimize the text segmentation neural network system for text segmentation. In embodiments, these additional mechanisms include at least one of an attention mechanism, similarity matching mechanism, and a topic-segmentation joint label mechanism. These mechanisms are discussed in further detail below.

The modified HRNN can use two layers of LSTM to extract two layers of information from input data. In particular, the first layer of the HRNN can be designated as a word-level LSTM layer. The word-level LSTM layer can be used to output a sentence vector h for each sentence input into the text segmentation neural network system. The sentence vector concentrates information and context of a given sentence into features represent aspects of the sentence in an independent manner. The second layer of the HRNN can be designated as a sentence-level bi-directional LSTM layer. The sentence-level bi-directional LSTM layer can be used to update hidden state of vector g. In particular, the hidden state of the second layer can encode vector g with the context from the sequence of sentences that were input into the text segmentation neural network system.

At block 402, data can be received. The data can be selected or input in any manner. The data can be a text. Such text can be a document (e.g., PDF), a transcript (e.g., audio transcript), and/or any other written form. For example, the data received can be a desired text selected from a repository. In other cases, the data received can be an automatically selected or detected text (e.g., from a webpage or text writing environment).

At block 404, the word-level LSTM can be applied to generate sentence vectors. These sentence vectors concentrate information and context from each word vector of a given sentence. In implementation, for a t-th sentence, the word-level LSTM layer updates a hidden state $h_{t,i}$ with a given i-th word embedding vector $w_{t,i}$. In this way, the final sentence vector $h_t$ can be defined as the final hidden state after the last word $w_{t,n_t}$.

Once sentence vectors h is determined for all the sentences in the input data, at block 406, the sequence of sentence vectors (e.g., $[h_{t-w}, \ldots, h_{t+w+1}]$) can be input into the sentence-level bi-directional LSTM layer of the HRNN. The sentence-level bi-directional LSTM layer can be used to update the hidden state of the sentence vectors (e.g., from the word-level LSTM) with the context from the sequence of sentences from the input data. In implementation, the sentence-level bi-directional LSTM layer can generate vector g encoded with the context from the sequence of sentences that were input into the text segmentation neural network system (e.g., $[h_{t-w}, \ldots, h_{t+w+1}]$). In this way, vector $g_{t-1}$ and vector $g_t$ can be generated. Vector $g_{t-1}$ can encode the context from sentences $s_{t-w}, \ldots, s_{t-2}, s_{t-1}, s_t, s_{t+1}, \ldots,$ and $s_{t+w+1}$. Vector $g_{t-1}$ can be used to encode target sentence vector, $t_p$, where $t_p$ indicates the hidden state of a target sentence encoded with the context from the sequence of past context sentences. Vector $g_t$ can encode the context from $s_{t-w}, \ldots, s_{t-2}, s_{t-1}, s_t, s_{t+1}, \ldots,$ and $s_{t+w+1}$. Vector $g_t$ can be used to encode target sentence vector, $t_f$, where $t_f$ indicates the hidden state of a target sentence encoded with the context from the sequence of future context sentences.

At block 408, an attention mechanism can be applied. The attention mechanism can be used to improve the performance of the text segmentation neural network system by enabling the system to focus on relevant inputs and discard and/or downplay irrelevant inputs. In particular, the attention mechanism can be used to weight sentence vectors generated using the sentence-level bi-directional LSTM layer. For instance, the attention mechanism can weight sentence vectors for the past context sentences and the past target sentence (e.g., $s_{t-1}, s_{t-2}, \ldots, s_{t-w}$). Further, the attention mechanism can weight sentence vectors for the future context sentences and the future target sentence (e.g., $s_t, s_{t+1}, \ldots, s_{t+w+1}$). Specifically, the attention mechanism in the HRNN can give a weight $a_j$ for a sentence vector $g_i$ with respect to the target sentence to focus on the relevant sentences in the sequence of sentences comprising the received data. In this way, context vectors, $c_p$ and $c_f$ can be obtained as a weighted sum of g of the past context sentences (e.g., $S_p = [s_{t-w}, \ldots, s_{t-1}]$) and the future context sentences (e.g., $S_f = [s_{t+1}, \ldots, s_{t+w+1}]$). An example equation for the attention mechanism can be:

$$a_j = \begin{cases} \frac{\exp(W_a[g_j; t_p])}{\sum_{k|s_k \in S_p} \exp(W_a[g_k; t_p])}, & \text{if } s_j \in S_p \\ \frac{\exp(W_a[g_j; t_f])}{\sum_{k|s_k \in S_f} \exp(W_a[g_k; t_f])}, & \text{if } s_j \in S_f \end{cases}$$

$$c_p = \sum_{j|s_j \in S_p} a_j g_j,$$

$$c_f = \sum_{j|s_j \in S_f} a_j g_j,$$

In such an equation, as can be the weight and $W_a$ can be a trainable attention matrix. Further, $g_j$ can be a vector output by the sentence-level bi-directional LSTM layer with $t_p$ indicating the hidden state of a target sentence encoded with the context from the sequence of past context sentences and $t_f$ indicating the hidden state of a target sentence encoded with the context from the sequence of future context sentences. In this way, such an equation can be used to find context vectors, $c_p$ and $c_f$.

Advantageously, the attention mechanism can be helpful in text segmentation because neural network systems are typically built on the assumption that the surrounding sentences belong to the same subpart. This assumption means that $g_{t-1}$ encodes the context from the other input sentences. The attention mechanism ensures that when sentences belong to different subparts in the text, the context sentences are weighted such that they have low attention weights. In this way, sentences irrelevant to the target sentences are weighted to obtain better context representation vectors for the past context representation vector, $c_p$, and the future context representation vector, $c_f$.

At block 410, a similarity matching mechanism can be applied. It should be appreciated that in some embodiments, the similarity matching mechanism is not added to the HRNN. The similarity matching mechanism can be used to explicitly add similarity information to the text segmentation neural network system. Such similarity information can be indicative of the comparison between past and future contexts and the different between the past and future context vectors. In particular, the similarity matching mechanism can be used to explicitly measure similarity between each of the generated vectors. For example, between the vectors generated by the sentence-level bi-directional LSTM layer (e.g., target sentence vector $t_p$ and target sentence vector $t_f$) and the vectors generated using the attention mechanism (e.g., context vector, $c_p$, and the context vector, $c_f$). In this way, similarity is measured between each of $t_p$, $t_f$, $c_p$, and $c_f$ (i.e., $t_p$ and $t_f$, $t_p$ and $c_p$, $t_p$ and $c_f$, $t_f$ and $c_p$, $t_f$ and $c_p$ and $c_f$). After measuring similarity between the content and target sentence vectors, the similarity can be concatenated as a six-dimensional distance vector, d. Using similarity scores determined using the similarity matching mechanism is advantageous in that distributed representations are used to determine the scores rather than of using pre-designated or pre-designed features.

The similarity matching mechanism can use any variety of methods for determining similarity between the vectors. In one embodiment, dot similarity can be used. Dot similarity takes the dot product of two vectors to determine a similarity score. An example equation defining dot similarity can be:

$$d_{xy} = \text{dot}(x,y) = x \cdot y$$

In another embodiment, cosign similarity can be used. Cosign similarity normalizes the dot similarity by the magnitude of the vectors being compared. An example equation defining cosign similarity can be:

$$d_{xy} = \cos(x, y) = \frac{x \cdot y}{\|x\| \|y\|}$$

In a further embodiment, weighted similarity can be used. Weighted similarity can be determined using a learnable similarity matrix, $W_d$. Using a weighted similarity does not weight all dimensions of the vectors equally. This can be advantageous because some dimensions of the vectors are more indicative that others in measuring similarity between the vectors being compared. For instance, similarity can be based on measuring the similarity in the context. An example equation defining weighted similarity can be:

$$d_{xy} = (y \circ x) \cdot W_d$$

In such an equation ∘ can denote a Hadamard product, otherwise known as an entry-wise product.

Upon determining d, the vector can be used to assign a topic-segmentation joint label to a decision point at block 412. It should be appreciated that in some embodiments, the similarity matching mechanism is not added to the HRNN. The topic-segmentation joint label mechanism combines segmentation labeling and topic labeling. Segmentation labeling indicates if a decision point is a segmentation point or not. Topic labeling can be used to assign a topic to a sentence. Combining these labels results in a representation of both topic information and lexical cues from the sentences in making the segmentation determination. The topic-segmentation joint label mechanism can be implemented using a feed-forward neural network. In particular, the concatenated six-dimensional distance vector, d, can be input into a feed-forward neural network layer. This feed-forward neural network layer then assigns a topic-segment joint label. An example equation defining the joint label can be written as:

$$l_j = f(s_j, t_j)$$

In such an equation, the segmentation label can be $s \in \{0,1\}$ and the topic label can be $t \in \{c_1, \ldots, c_k\}$ where c is the topic ID (e.g., based on the topics obtained from the unsupervised clustering) and k is the pre-defined number of topics in the data. The function $f$ can combine the segmentation label and the topic label using any one-to-one function that maps each pair to a unique value. For instance, $f(s, t) = 2t+s$. The joint label can then be used to determine a final segmentation label, s. In this way, s can be obtained using, for example, $f^{-1}(l_j)$ such that $l_j$ is output by the text segmentation neural network system at block 414.

If method 400 is being carried out during training of the text segmentation neural network system, at block 416, any errors determined by loss can be used to correct the system. Incorporating loss functions in the training process means that the text segmentation neural network system can be modified or adjusted based on the accuracy of an output label (e.g., $l_j$) such that each iteration of training increases the success of the network. In an embodiment with the attention mechanism, the similarity matching mechanism, and the topic-segmentation joint label mechanism, the hidden units of the word-level LSTM, the sentence-level LSTM, and the feed-forward neural network layers can each be set to 256 nodes. Further, a learning rate can be set to 0.001. Such a learning rate means that the neural network system is not modified or adjusted more than 0.001 per training iteration. Blocks 402 to 416 can be repeated for a number of iterations during training (e.g., until the error rate is below a predefined threshold).

Figure 5:
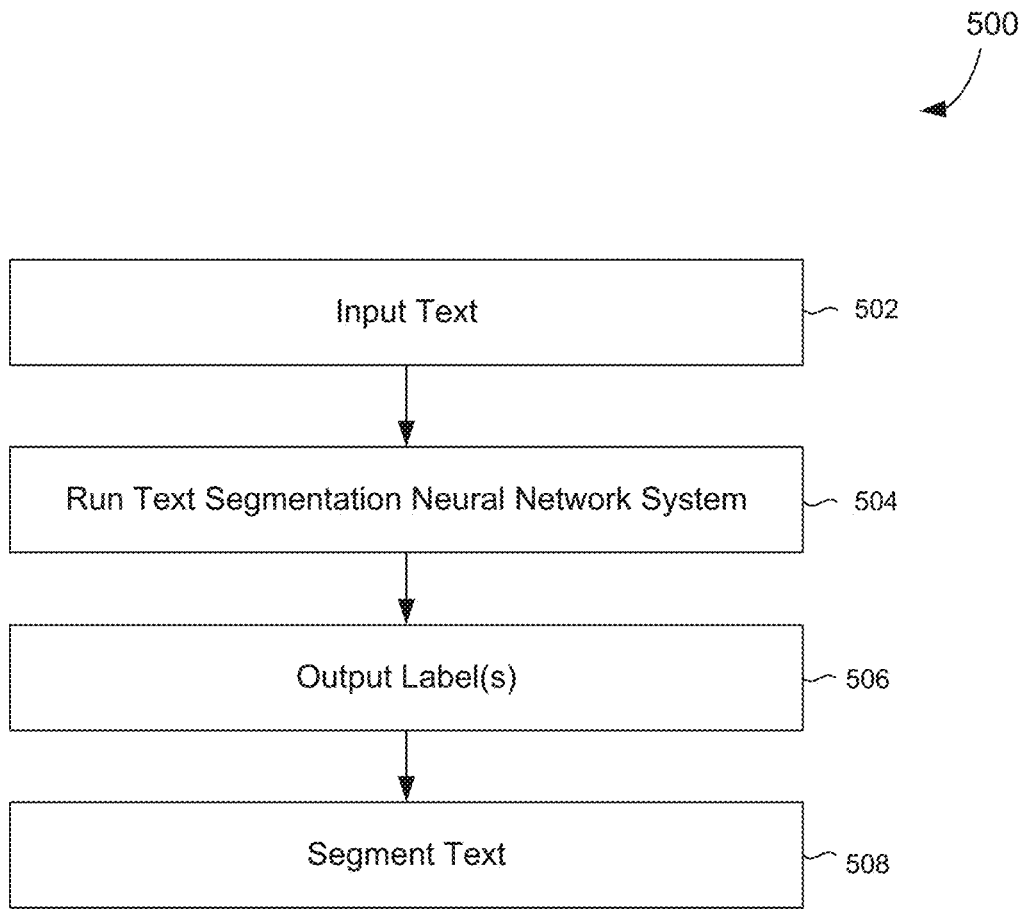
FIG. 5 depicts a process flow showing an embodiment of a method for using a trained text segmentation neural network system to segment a text, in accordance with embodiments of the present disclosure.

With reference to FIG. 5, a process flow is provided showing an embodiment of method 500 for using a trained text segmentation neural network system to segment a text, in accordance with embodiments of the present disclosure.

At block 502, a text can be input. Such a text can be selected for input from a data store, from a text database stored in the cloud, and/or from a user device. In particular, a user can select a text to input into the trained network. A text can be selected or input in any manner. For example, a user may input a text written using a device. As another example, a user may select a desired text from a repository, for example, stored in a data store accessible by a network or stored locally at a user device. Such a text can be in any form (e.g., text document, PDF, etc.).

In some embodiments, upon inputting a text, the text can undergo preprocessing. Preprocessing the text can include normalizing the text, removing stop words, and/or separating the processed text into sentence segments. For instance, if an input text is in PDF form, preprocessing can include converting a PDF text into a text searchable form. Next, the text can be normalized, have stop words removed, and/or separated into sentence segments for processing.

At block 504, the input text can be fed into a trained text segmentation neural network system. The trained text segmentation neural network system applies its learned weights to the text to assign labels to decision points. In an embodiment, decision points can be analyzed between each sentence segment for the text. At block 506, the system can output labels for the decision points in the text. This can be accomplished, for example, by using a modified HRNN with text segmentation specific mechanisms.

At block 508, the text can be segmented using the output labels. For instance, segmenting the text at the decision points labeled as segmentation points. This segmented text can be sent, for example, to a user device, for display. Such a segmented text can be displayed using a graphical user interface on a user device. For example, a text can be submitted by a user into an application on a user device, and upon segmenting the text, the segmented text can be displayed to the user via the device.

Figure 6:
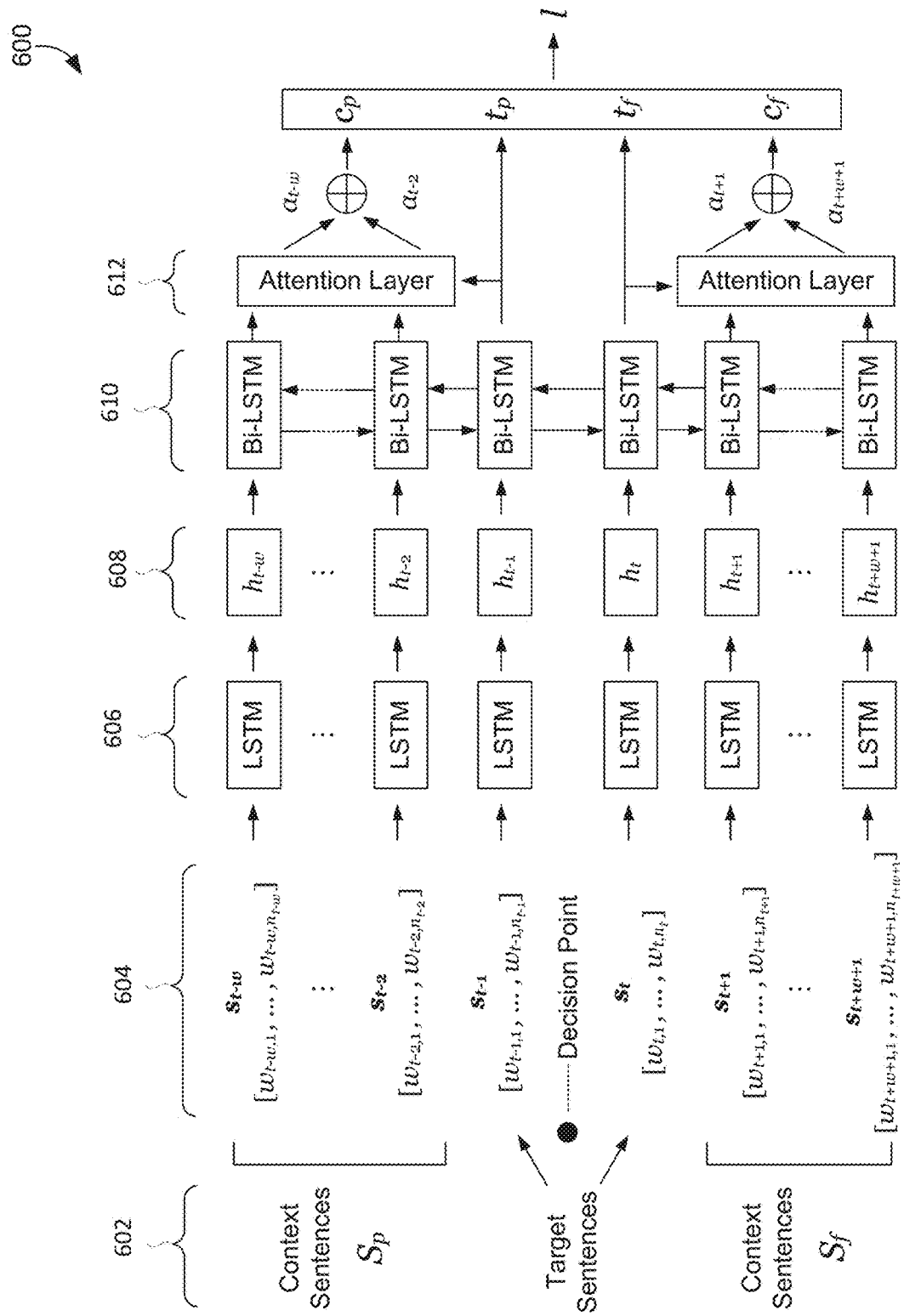
FIG. 6 illustrates an example environment that can be used for training and/or implementing a text segmentation neural network system to assign labels to decision points in a text, in accordance with embodiments of the present disclosure.

FIG. 6 illustrates an example environment 600 that can be used for training and/or implementing a text segmentation neural network system to assign labels to decision points in a text, in accordance with embodiments of the present disclosure. As depicted, the text segmentation neural network system can be comprised of a modified HRNN with an attention mechanism.

Input 602 can be converted into sentences comprised of word vectors 604. These word vectors can be fed into LSTM layers 606. LSTM 606 outputs sentence vectors 608 for each sentence input into the text segmentation neural network system. These sentence vectors can be fed into Bi-LSTM layers 610. Bi-LSTM 610 outputs sentence vectors with and updated hidden state of based on context from the sequence of sentences input into the text segmentation neural network system. The output of Bi-LSTM 610, vector $g_{t-1}$ can be treated as $t_p$ indicating the hidden state of a first target sentence encoded with the context from the sequence of input sentences. The output of Bi-LSTM 610, vector $g_t$ can be treated as $t_f$ indicating the hidden state of a second target sentence encoded with the context from the sequence of input sentences.

The outputs of Bi-LSTM 610 that correspond to the context sentences can be input into attention layer 612. Attention layer 612 can be used to weight the context sentence vectors generated using Bi-LSTM 610. In this way, context vectors, $c_p$ and $c_f$ can be obtained as a weighted sum of context sentence vectors (e.g., $S_p = [s_{t-w}, \ldots, s_{t-1}]$ and $S_f = [s_{t+1}, \ldots, s_{t+w+1}]$).

These vectors can then be used to determine a label for the decision point. A label can be assigned using any number of methods. In some embodiments, a segmentation label can be used. In other embodiments, a topic label can be used. In still further embodiments, a joint label can be used, combining both a topic and segmentation label.

During iterations in which the text segmentation neural network system is undergoing training, the loss in the network can be determined and fed back though the network to decrease the loss in further iterations. Iterations of training can be repeated for a sufficiently large number of training cycles, until the neural network system converges to a desired state (e.g., where errors fall below a predetermined threshold such that the output produced reaches a desired threshold minimum of loss between input data and output labels).

Figure 7:
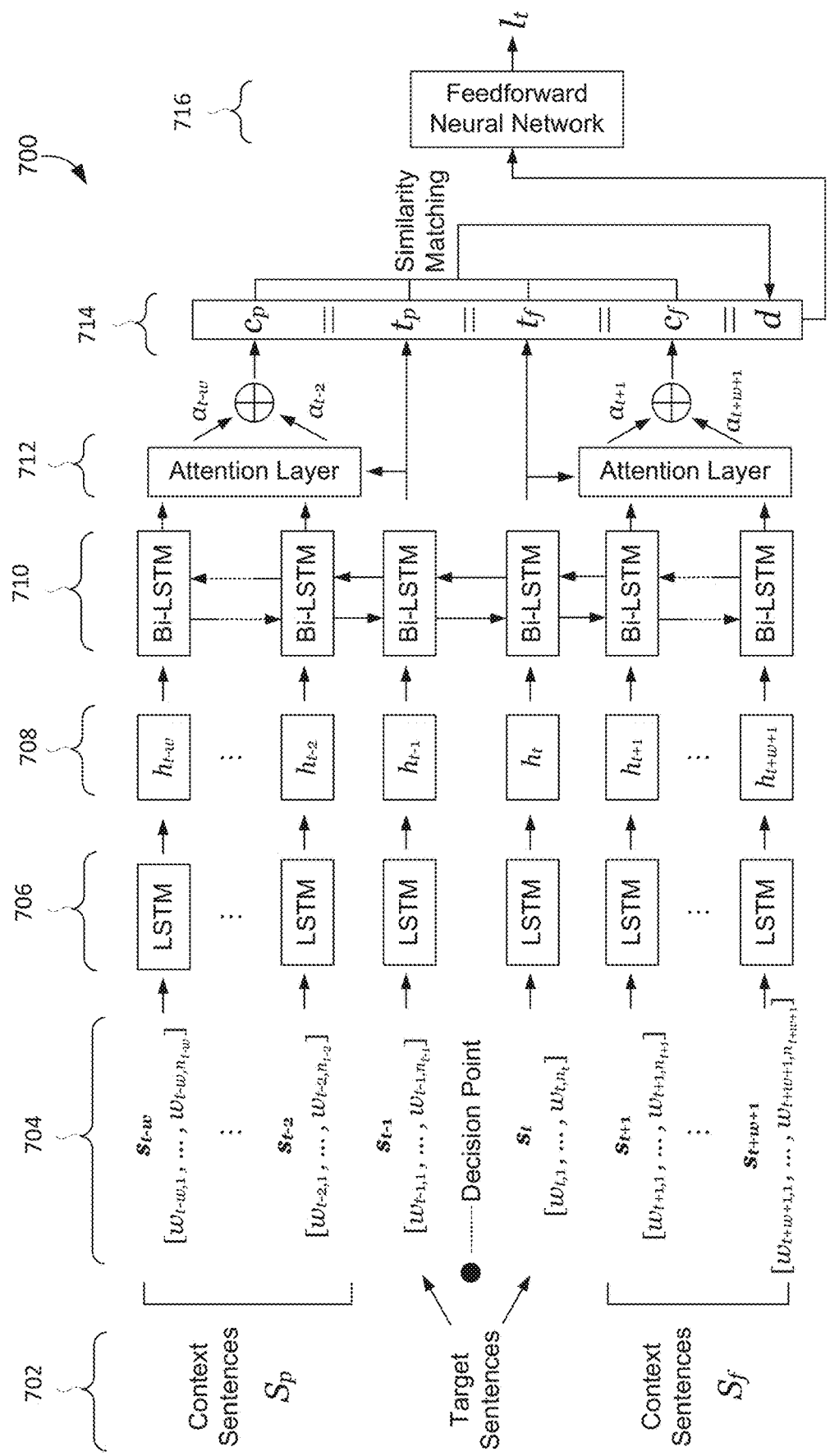
FIG. 7 illustrates an example environment that can be used for training and/or implementing a text segmentation neural network system to assign labels to decision points in a text, in accordance with embodiments of the present disclosure.

FIG. 7 illustrates an example environment that can be used for training and/or implementing text segmentation neural network system 700 to assign labels to decision points in a text, in accordance with embodiments of the present disclosure. A trained text segmentation neural network system can be comprised of a modified HRNN with an attention mechanism, similarity matching mechanism, and topic-segmentation joint topic labeling mechanism.

Input 702 can be converted into sentences comprised of word vectors 704. These word vectors can be fed into LSTM layers 706. LSTM 706 outputs sentence vectors 708 for each sentence input into the text segmentation neural network system. These sentence vectors can be fed into Bi-LSTM layers 710. Bi-LSTM 710 outputs sentence vectors with and updated hidden state of based on context from the sequence of sentences input into the text segmentation neural network system. The output of Bi-LSTM 710, vector $g_{t-1}$ can be treated as $t_p$ indicating the hidden state of a first target sentence encoded with the context from the sequence of input sentences. The output of Bi-LSTM 710, vector $g_t$ can be treated as $t_f$ indicating the hidden state of a second target sentence encoded with the context from the sequence of input sentences.

The outputs of Bi-LSTM 710, that correspond to the context sentences can be input into attention layer 712. Attention layer 712 can be used to weight the context sentence vectors generated using Bi-LSTM 710. In this way, context vectors, $c_p$ and $c_f$ can be obtained as a weighted sum of context sentence vectors (e.g., $S_p=[s_{t-w}, \ldots, s_{t-1}]$ and $S_f=[s_{t+1}, \ldots, s_{t+w+1}]$).

Similarity matching 714 can be applied to target sentence vector (e.g., $t_p$), target sentence vector (e.g., $t_f$), past context vector (e.g., $c_p$), and future context vector (e.g., $c_f$). After measuring similarity between the content and target sentence vectors, similarity matching 714 concatenates the vectors as a six-dimensional distance vector, d. Feedforward neural network 716 can use vector d to assign a topic-segmentation joint label (e.g., $l_t$) to the decision point.

Figure 8:
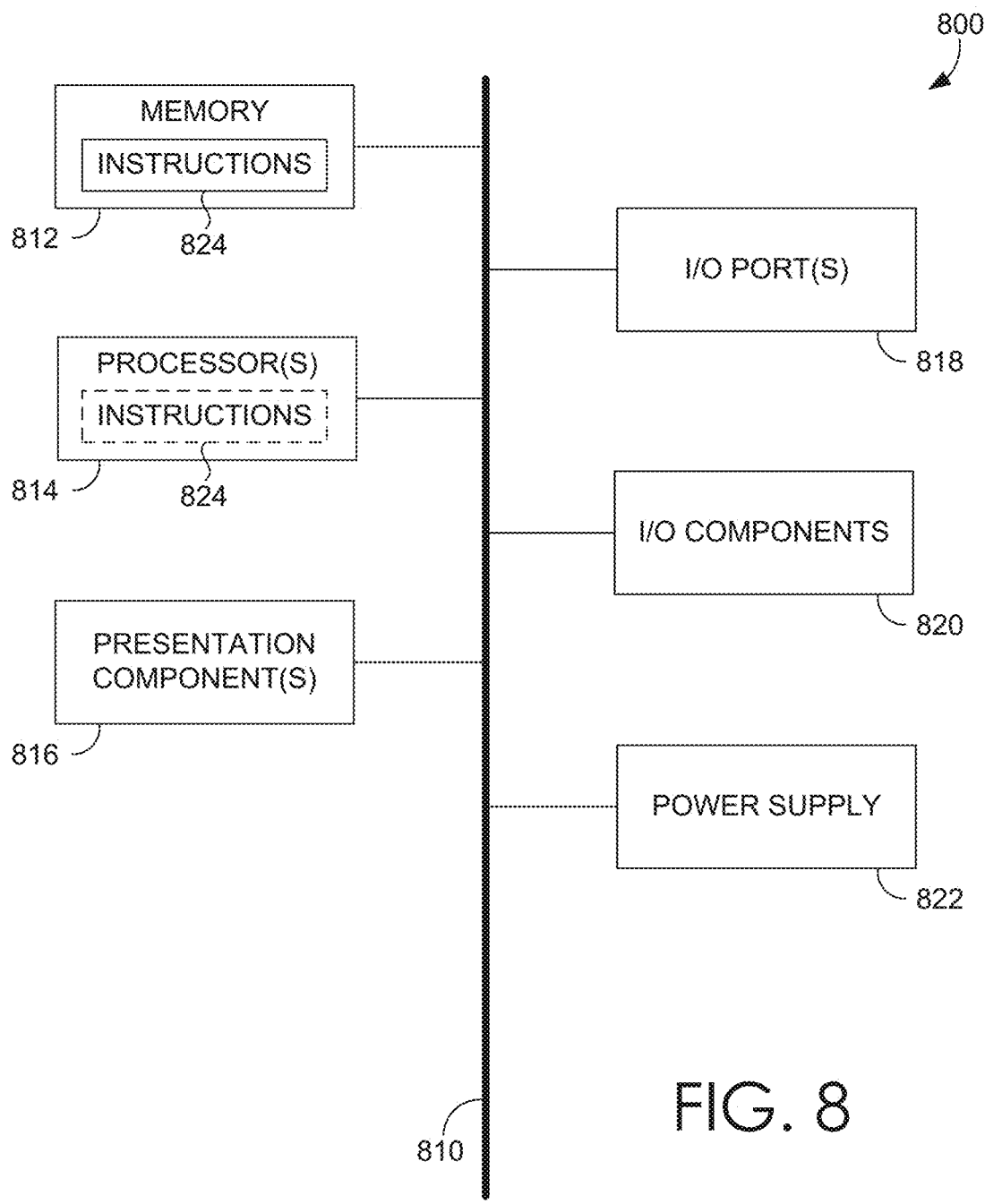
FIG. 8 is a block diagram of an example computing device in which embodiments of the present disclosure may be employed.

During iterations in which the text segmentation neural network system is undergoing training, the loss in the network can be determined and fed back though the network to decrease the loss in further iterations. Iterations of training can be repeated for a sufficiently large number of training cycles, until the neural network system converges to a desired state (e.g., where errors fall below a predetermined threshold such that the output produced reaches a desired threshold minimum of loss between input data and output labels With reference to FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more computer-readable media having a plurality of executable instructions embodied thereon, which, when executed by one or more processors, cause the one or more processors to perform a method, the method comprising:
receiving, by a neural network system, a set of sentences, wherein the set of sentences includes past context sentences, future context sentences, a past target sentence, and a future target sentence that surround a decision point in a text;
generating context sentence vectors for the past and future context sentences and target sentence vectors for the past and future target sentences, wherein the context sentence vectors and the target sentence vectors are encoded with context from the set of sentences;
weighting, using an attention mechanism of the neural network system, the context sentence vectors based on relevance of the past context sentences to the past target sentence and relevance of the future context sentences to the future target sentence; and
using the weighted context sentence vectors to determine a label for the decision point.

2. The media of claim 1, the method further comprising:
measuring, using a similarity mechanism of the neural network system, similarities between the target sentence vectors and the context vectors; and
concatenating the similarities into a distance vector.

3. The media of claim 2, the method further comprising:
assigning, using a topic-segment joint label mechanism of the neural network system, the label for the decision point based on the distance vector, wherein the label designates a joint label.

4. The media of claim 2, wherein the measuring of the similarities uses one of dot similarity, cosign similarity, and weighted similarity.

5. The media of claim 1, the method further comprising:
during a first iteration of training, determining loss using a comparison between the label and a ground-truth label; and
adjusting the neural network system based on the determined loss.

6. The media of claim 1, the method further comprising:
generating context vectors using the weighted sentence vectors, wherein the context vectors comprise a past context vector generated as a weighted sum of past context sentence vectors and a future context vector generated as a weighted sum of future context sentence vectors; and
further using the context vectors in the determination of the label for the decision point.

7. The media of claim 1, the method further comprising:
analyzing the label for the decision point; and
segmenting the text based on the label for the decision point indicating a segmentation point in the text.

8. The media of claim 1, the method further comprising:
processing the text for input into the neural network system, wherein processing the text comprises one or more of normalizing the text, removal of stop words from the text, and converting words of the text into word vectors.

9. The media of claim 1, the method further comprising:
outputting, from the neural network system, the label for the decision point in the text.

10. A computer-implemented method comprising:
receiving a set of sentences into a neural network system, wherein the set of sentences includes context sentences and target sentences that surround a decision point in a text;
generating context sentence vectors and target sentence vectors encoded with context from the set of sentences;
outputting, from the neural network system, a label for the decision point in the text based on the context vectors;
analyzing the label for the decision point; and
segmenting the text based on the label for the decision point indicating a segmentation point in the text.

11. The computer-implemented method of claim 10, further comprising:
measuring, using a similarity mechanism of the neural network system, similarities between the target sentence vectors and the context vectors; and
concatenating the similarities into a distance vector.

12. The computer-implemented method of claim 10, further comprising:
wherein the measuring of the similarities uses one of dot similarity, cosign similarity, and weighted similarity.

13. The computer-implemented method of claim 11, further comprising:
assigning, using a topic-segment joint label mechanism of the neural network system, the label for the decision point based on the distance vector, wherein the label designates a joint label.

14. The computer-implemented method of claim 10, further comprising:
during iterations of training, determining loss using a comparison between the label and a ground-truth label; and
adjusting the neural network system based on the determined loss.

15. The computer-implemented method of claim 10, further comprising:
wherein the loss is cross entropy loss.

16. The computer-implemented method of claim 10, further comprising:
processing the text for input into the neural network system, wherein processing the text comprises one or more of normalizing the text, removal of stop words from the text, and converting words of the text into word vectors.

17. The computer-implemented method of claim 10, further comprising:
selecting a text for segmentation;
separating the text into sentences; and
determining the set of sentences from the sentences to input into the neural network system.

18. A computing system comprising:
one or more hardware processors and memory configured to provide computer program instructions to the one or more hardware processors;
a text segmentation component configured to use the one or more hardware processors to:
implement a neural network system, wherein the neural network system generates weighted sentence vectors encoded with context from a set of sentences, wherein weighted sentence vectors are associated with labels that are assigned to decision points in a text;
analyze the labels that are assigned to the decision points in the text; and
segment the text based on the labels that are assigned to the decision points indicating a segmentation point in the text.

19. The system of claim 18, further comprising:
training the neural network system, wherein the training updates the neural network system for error determined between an output label and a ground-truth label.

20. The system of claim 18, further comprising:
selecting a text for segmentation;
separating the text into sentences; and
determining the set of sentences from the sentences to input into the neural network system.

* * * * *